United States Patent [19]
Abiko

[11] Patent Number: 4,835,757
[45] Date of Patent: May 30, 1989

[54] SYSTEM FOR RECORDING INFORMATION ONTO DISK MEDIUM

[75] Inventor: Takashi Abiko, Kawasaki, Japan

[73] Assignee: Kabushiki Kaisha Toshiba, Kawasaki, Japan

[21] Appl. No.: 89,834

[22] Filed: Aug. 27, 1987

[30] Foreign Application Priority Data

Aug. 29, 1986 [JP] Japan ................ 61-203340

[51] Int. Cl.⁴ .......................... G11B 5/09; G06F 11/10
[52] U.S. Cl. ......................... 369/54; 369/58; 369/48; 369/32; 360/53; 371/38
[58] Field of Search ............... 369/54, 58, 32, 48, 369/49, 50; 360/53; 371/38

[56] References Cited

U.S. PATENT DOCUMENTS

| | | | |
|---|---|---|---|
| 4,498,146 | 2/1985 | Martinez | 364/900 |
| 4,523,304 | 6/1985 | Satoh et al. | 369/32 X |
| 4,545,044 | 10/1985 | Satoh et al. | 369/54 X |
| 4,571,716 | 2/1986 | Szerlip | 369/53 X |
| 4,611,314 | 9/1986 | Ogata et al. | 369/54 X |
| 4,638,472 | 1/1987 | Ogata et al. | 369/54 |
| 4,706,136 | 11/1987 | Wentzel et al. | 360/53 X |
| 4,730,290 | 3/1988 | Takasago et al. | 369/54 X |
| 4,750,178 | 6/1988 | Sako et al. | 371/38 X |
| 4,768,181 | 8/1988 | Ichinose et al. | 369/54 |

FOREIGN PATENT DOCUMENTS

| | | | |
|---|---|---|---|
| 0127732 | 3/1984 | European Pat. Off. | 369/54 X |
| 3403290 | 8/1985 | Fed. Rep. of Germany | 369/54 X |

*Primary Examiner*—William L. Sikes
*Assistant Examiner*—Brian M. Healy
*Attorney, Agent, or Firm*—Finnegan, Henderson, Farabow, Garrett & Dunner

[57] ABSTRACT

An optical disk stores the error management information indicating error areas, which are found in manufacturing an optical disk and in recording information, and the error management information further indicating areas used as substitutions of the error areas. An optical disk apparatus reads out of the optical disk the error management information indicating the in-manufacturing and in-recording error areas and the substitution areas, and stores the readout information into a memory buffer. A controller of the optical disk apparatus checks whether an area to be accessed in recording or reproducing the information into and from the optical disk is the error area or not by referring the error management information in the buffer memory.

10 Claims, 9 Drawing Sheets

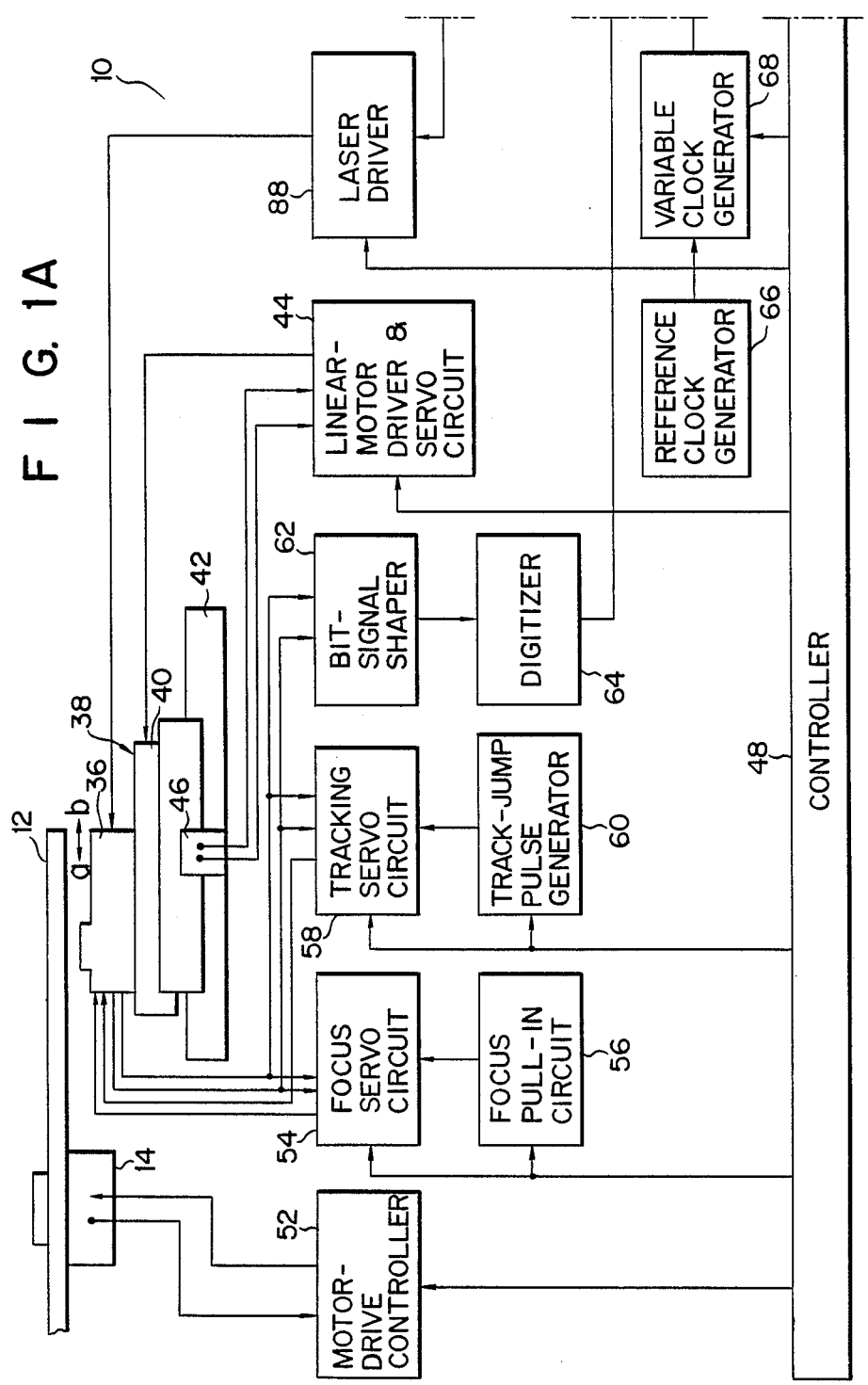

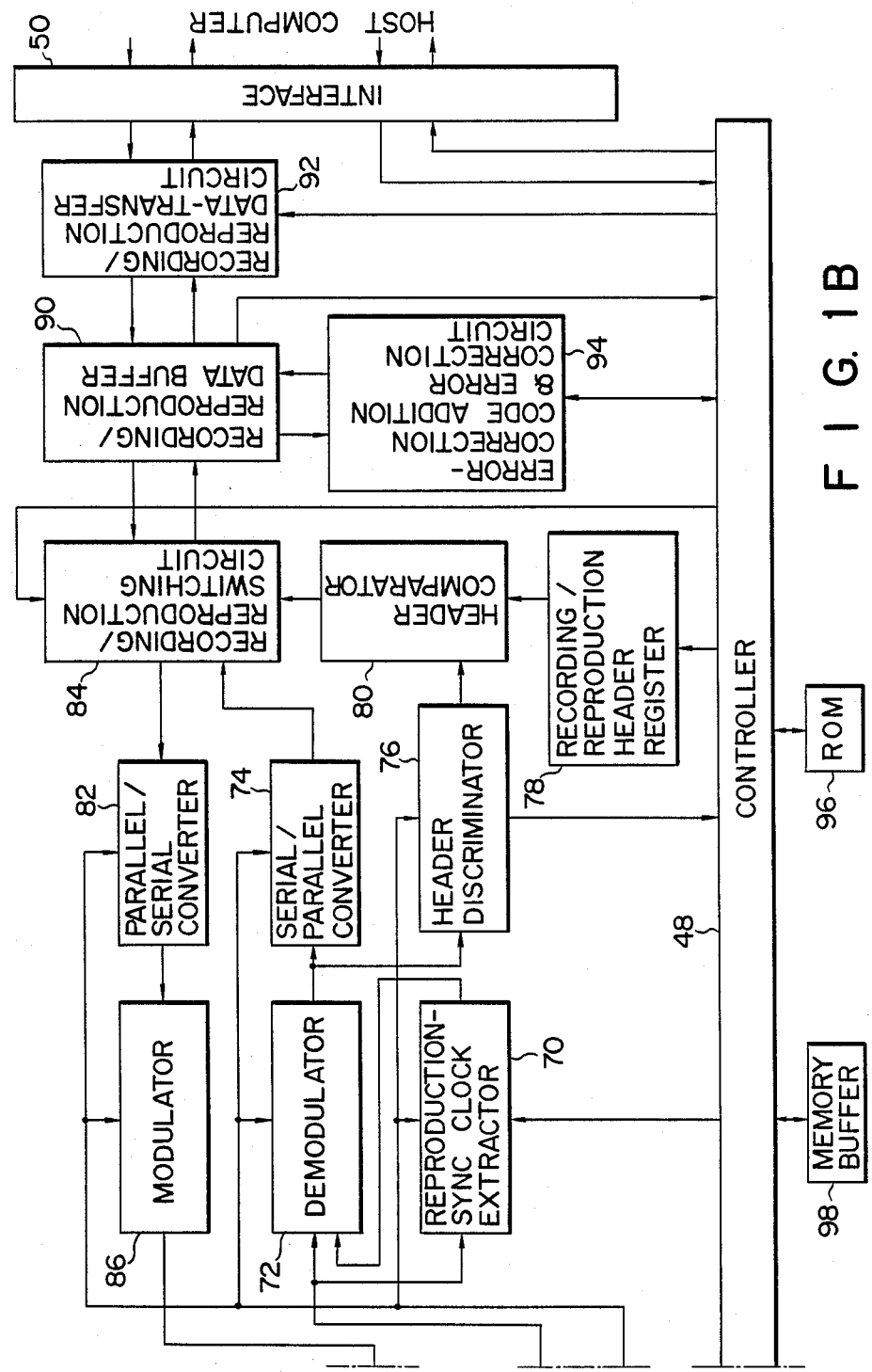
F I G. 1B

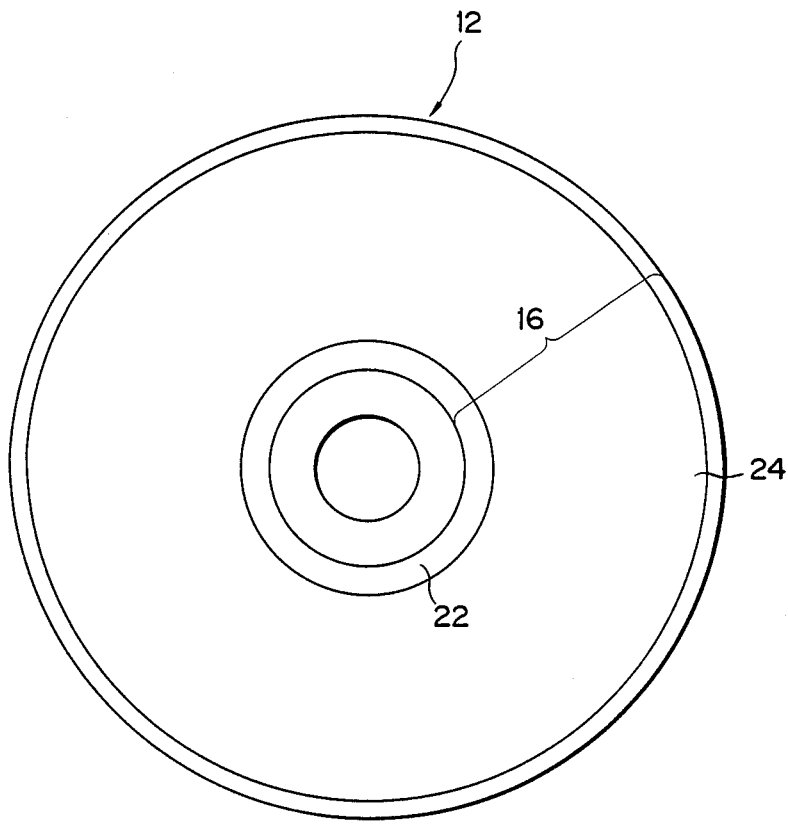
F I G. 3

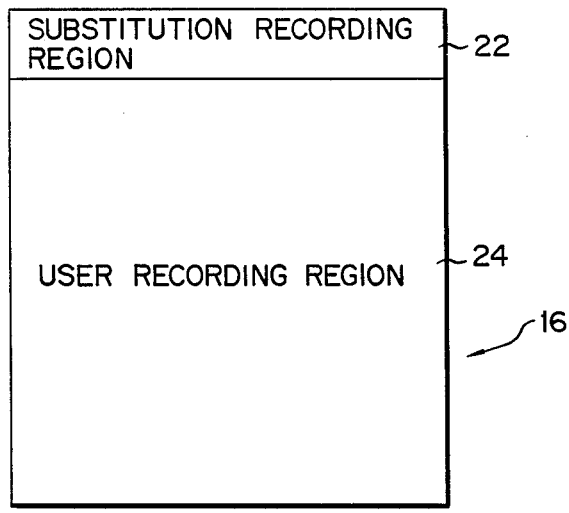
F I G. 4
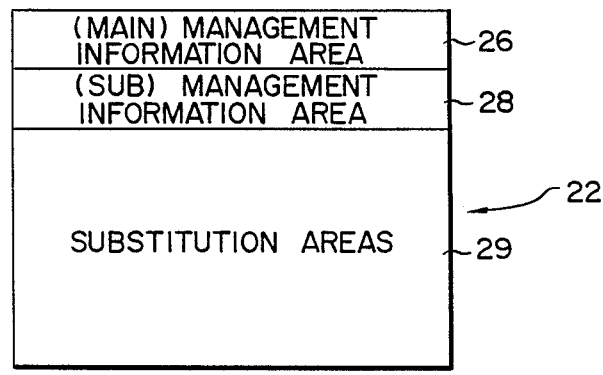
F I G. 5

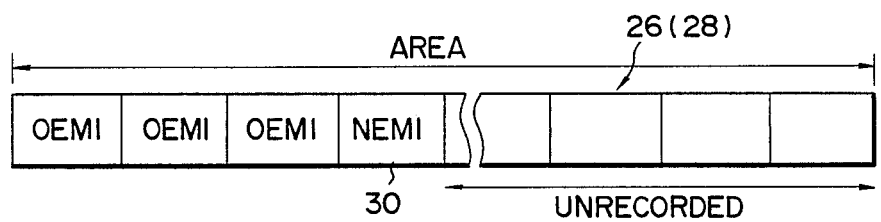
F I G. 6
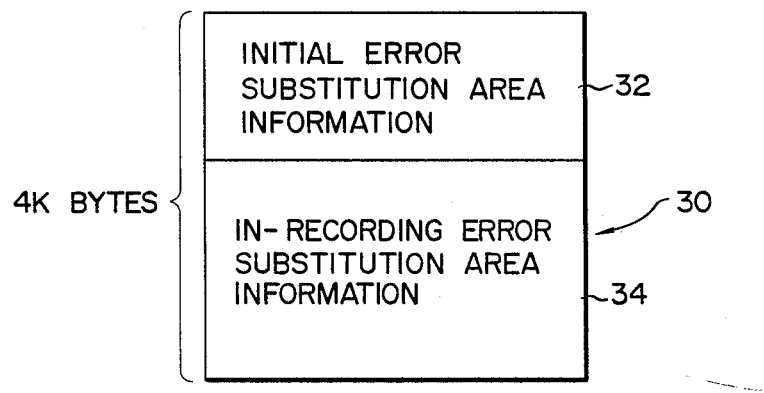
F I G. 7

| CLOCK RATE DATA | NUMBER OF SECTOR | START SECTOR NUMBER | FIRST BLOCK NUMBER |
|---|---|---|---|
| 1 | 40 | 0 0 | 0 0 0 0 0 0 |
| 2 | 39 | 1 5 | 0 0 2 4 5 9 |
| 3 | 38 | 4 0 | 0 0 5 2 1 0 |
| ⋮ | ⋮ | ⋮ | ⋮ |
F I G. 8
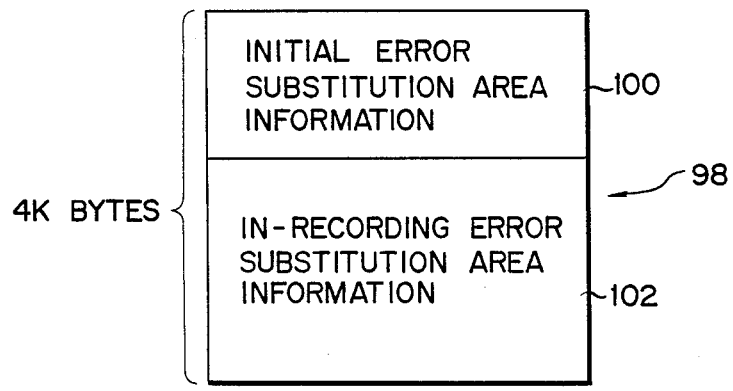
F I G. 9

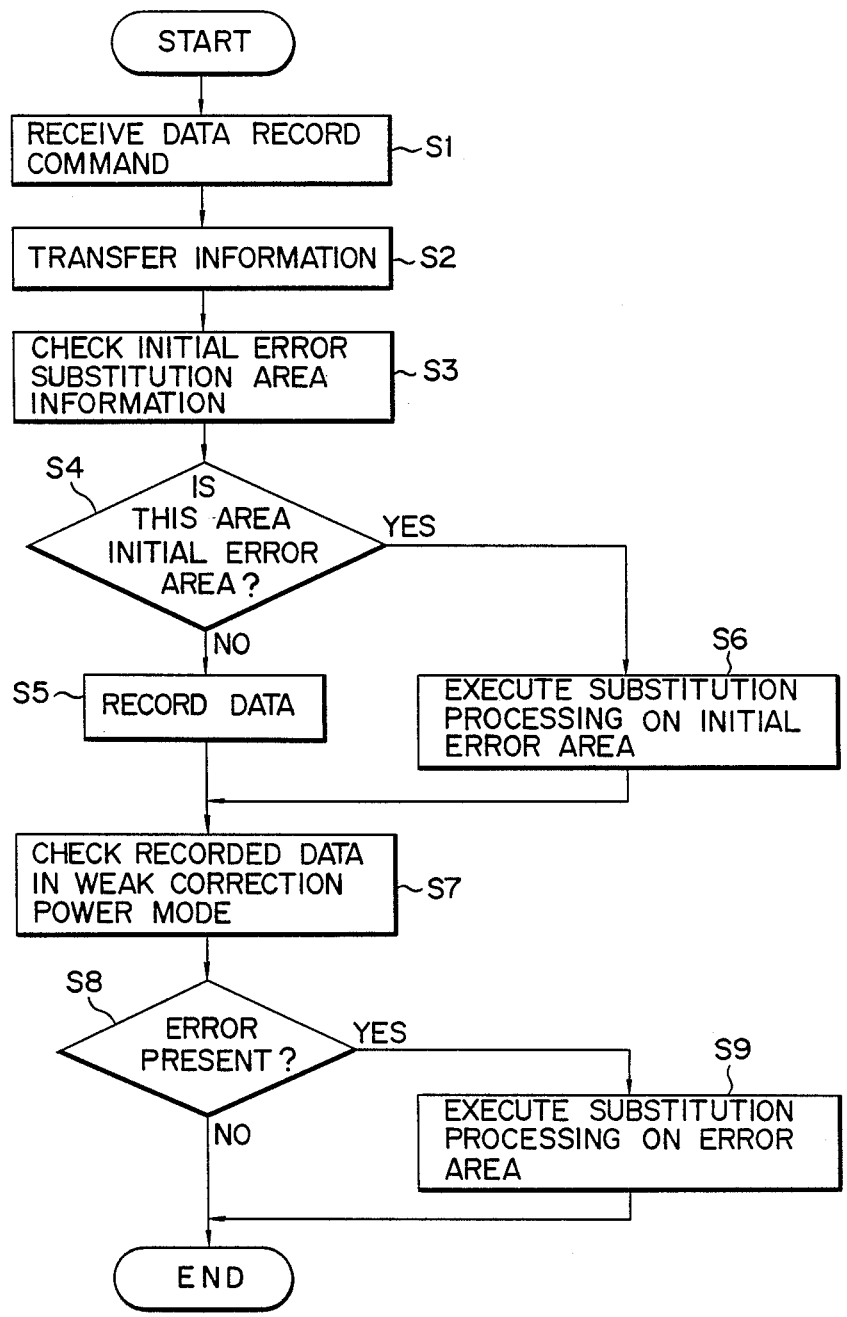
F I G. 10

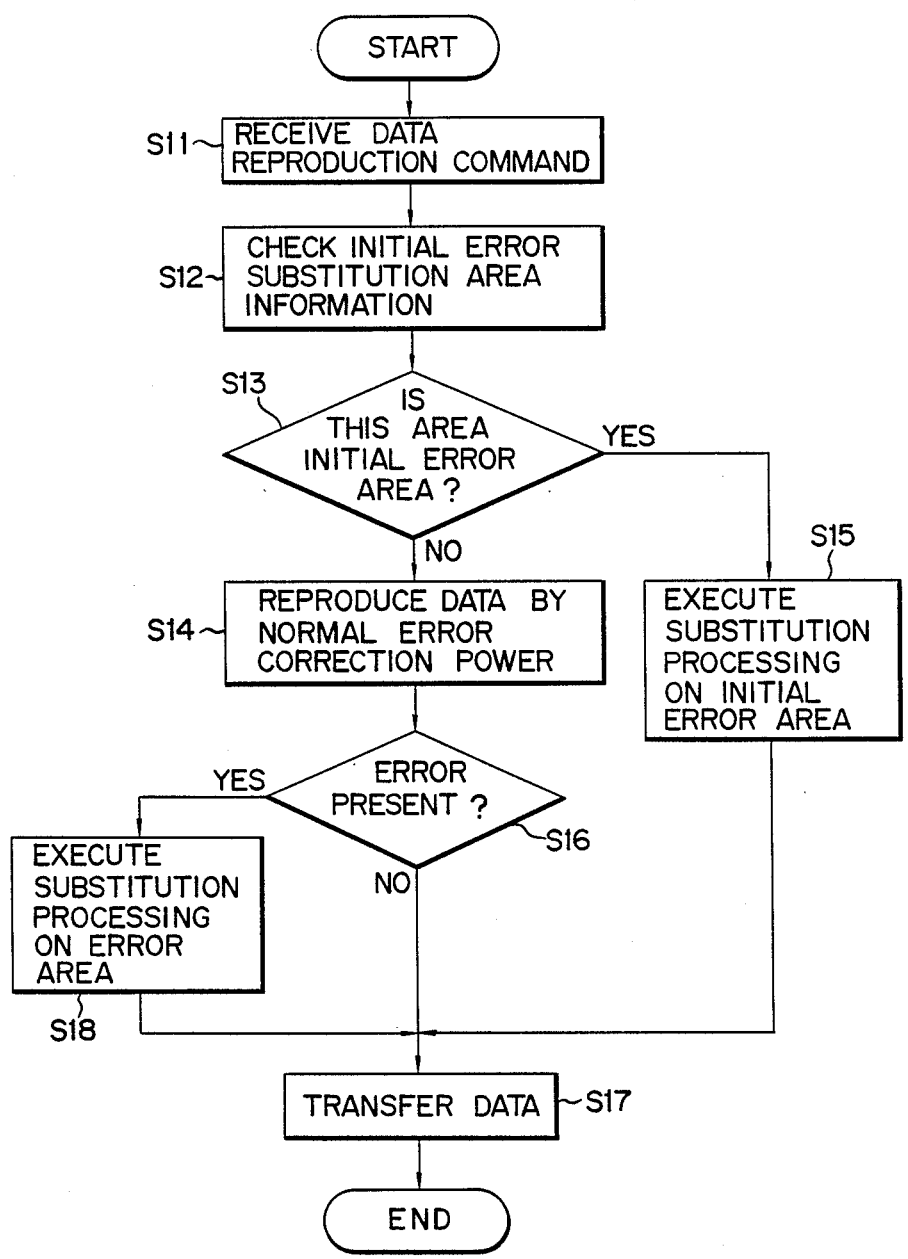
F I G. 11

SYSTEM FOR RECORDING INFORMATION ONTO DISK MEDIUM

BACKGROUND OF THE INVENTION

This invention relates to an information processor such as an optical disk apparatus for recording and reproducing information to and from an optical disk as a recording medium.

Image data filing systems record, retrieve and reproduce a great amount of image information contained in documents. In the filing system, image information is recorded and reproduced into and from a data recording medium, e.g., an optical disk, by a data processor such as an optical disk apparatus. This type of the optical disk apparatus employs an optical disk of the type in which information is spirally recorded. In recording or reproducing information, an optical head is driven by a linear motor, and rectilinearly moved above the optical disk and in the radial direction of the disk.

In the optical disk, a reference position mark is provided in the vicinity of the center of the optical disk. The optical disk is segmented into 256 sectors numbered "0" to "255" starting from the reference position mark as "0". The unitary area for data recording/reproduction on the optical disk is called a "block". The fixed length data is recorded and reproduced to and from one block. In the inner side of the optical disk, one block contains 40 sectors, while in the outer peripheral side, one block contains 20 sectors. A block header containing a block number, a track number, etc. is recorded at the start position of the block, in a factory. To prevent the block from terminating off the border between sectors, a block gap is used.

In this type of optical disk, to check error areas or blocks, preheader data recorded when manufactured is read out, and the error checked data is recorded in the optical disk. The recording operation to the optical disk is performed jumping the error area, on the basis of the error checked data. When the recording operation is performed, the image information filing system, i e., the host computer, performs the read-after-write. When information cannot be read out of an area, or a block, the host computer performs the correction, i.e., the re-record. After the correction, if data cannot be read out from the block, this block is decided to be an error block. The information, which should be recorded into the error block, is recorded into another block. The error block is recorded into an error management area of the optical disk.

In the optical disk thus constructed, the error areas, which are found in manufacturing the optical disks (these areas will be referred to as in-manufacturing error areas), will never be subjected to the information recording. The error areas, which are found in recording information (these areas will be referred to as in-record error areas), are also not used, but other areas under control by the host computer are used as substitutions of the formers, under control of the host computer. That recorded information is written into the substitution area. This inevitably reduces the user recording region on the optical disk.

The substitution areas are under control of the host computer, and are not fixed in their locations on the optical disk. In use, it is impossible, therefore, to exchange different optical disks.

The optical disk device stores the error management information for the in-manufacturing error areas, and the error management information correspondingly containing the in-record error areas and the substitution areas, into different memory buffers. The in-record error areas and the substitution areas are controlled by the host computer. The control processing is complicated and time consuming.

Since the error management information are stored into two different memory buffers, as mentioned above, in setting (or opening) the optical disk, the management information must be read out from two recording areas. In removing (or closing) the disk, the information must be written into the two areas. Thus, the optical disk opening and closing requires two times the number of accesses to the optical disk. This work consumes time and is troublesome.

Further, the memory capacity of the memory buffers is not equal to the unit of the record information, making the error information processing complicated.

SUMMARY OF THE INVENTION

Accordingly, an object of this invention is to provide an information processor which can quickly process the information in a record mode, to make the host computer free from the processing for the substitution areas, and to simplify and quicken the access to the optical disk at the time of disk opening and closing.

Another object of this invention is to provide an information processor in which the processing for the error management information is easy.

A further object of this invention is to provide an information recording medium which has a compatibility with other recording medium in the substitution areas, which are for controlling the substitution processing for the error areas, without any reduction of the actual recording capacity of the user recording region.

According to one aspect of this invention, there is provided an information processor for recording and reproducing information to and from an information recording medium recording error management information at a predetermined location, the error management information including initial error substitution area information indicating substitution areas, which are used for recording the information in place of initial error areas as are found in manufacturing the information recording medium and may not be used for recording information correctly, the substitution areas being positioned in predetermined locations, and in-record substitution area information indicating substitution areas, which are used for recording the information in place of in-record error areas as are found in recording information on the information recording medium and may not be used for recording information correctly, the substitution areas being positioned in predetermined locations, the information processor comprising means for reading out the error management information from the information recording medium and storing the read-out information therein when the information processor is started up, first substitution processing means for checking whether an area to be accessed in recording the information in the information recording medium is the initial error area or not by using the initial error substitution area information stored in the storage means, when the accessed area is the initial error area, accessing the substitution area designated by the initial error substitution area information stored in the storage means, and recording information into the designated area of the recording medium, means for recording information into the accessed area when the first substitution processing means decides that the accessed area is not the initial error area, and second substitution processing means for, after information is recorded into the information recording medium by the recording means, reading out the recorded information, correcting the error of the read out information, to thereby effect the information reproduction, when the information reproduction is improper, deciding information recording area to be the in-record error area, recording the read out information into another area of the substitution area, and updating the in-record error substitution area information so as to contain a correspondence between the in-record error area and the other area of the substitution area.

According to another aspect of this invention, there is provided an information recording medium for recording information comprising a recording region for recording information, a substitution area, when information is recorded into the recording region of the information recording medium, if an error area unable to correctly record information is found in the recording region, the substitution area being used for recording the information to be recorded in the error area, in place of the error area, and management information area for recording error management information to indicate the place of the substitution area used as a substitution of the error area in the information recording medium, the error management information, as updated every time the error area is found, being sequentially recorded into the management information area.

BRIEF DESCRIPTION OF THE DRAWINGS

FIGS. 1A and 1B cooperatively show a schematic representation of an optical disk apparatus as an information processor according to an embodiment of this invention;

FIG. 3 shows a plan view of the optical disk of FIG. 1;

FIG. 4 shows a recording map for explaining a substitution recording region and a user recording region on the optical disk;

FIG. 5 shows a recording map for explaining the configuration of the substitution recording region on the optical disk;

FIG. 6 shows a recording format of an example of a management information area on the optical disk;

FIG. 7 shows a recording format of an example of an error management information;

FIG. 8 shows a memory format of a conversion table;

FIG. 9 shows a memory format of a memory buffer;

FIG. 10 shows a flowchart for explaining the record operation; and

FIG. 11 shows a flowchart for explaining the reproduction operation.

DETAILED DESCRIPTION OF THE PREFERRED EMBODIMENT

Figure 2:
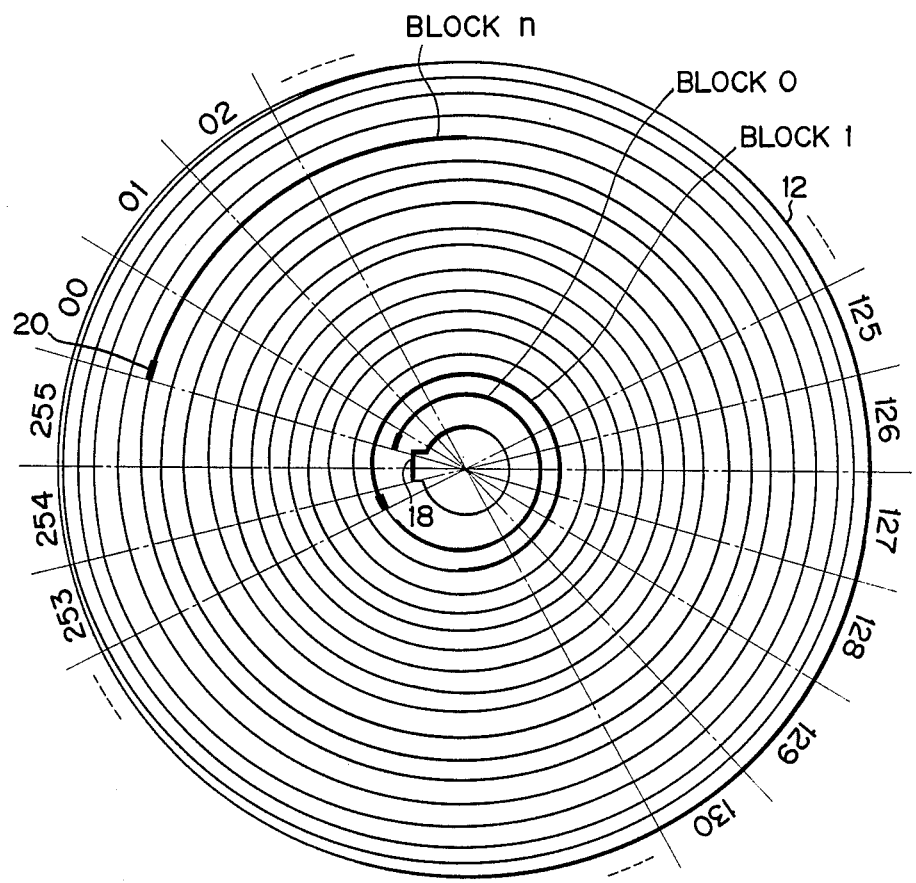
FIG. 2 shows a diagram useful in explaining the construction of an optical disk as a recording medium, which is used in the information processor of FIG. 1.

An embodiment of this invention will be described referring to the accompanying drawings.

FIGS. 1A and 1B show a schematic illustration of optical disk apparatus 10 as an information processor according to an embodiment of this invention. This apparatus 10 uses optical disk 12 as an information recording medium. Optical disk 12 contains a spiral or concentric data recording section with fixed pitches in the radial direction. This disk is rotated by motor 14.

Optical disk 12 comprises a circular base made of glass or plastics and a doughnut-like metal coating or recording film 16 of a metal such as tellurium or bismuth, formed on the circular base, as is shown in FIGS. 2 and 3. Optical disk 12 has reference position mark 18 as a notch in the vicinity of the center of the metal coating.

The surface of optical disk 12 is divided into 256 sectors, "0" to "255", with the reference position mark 18 as "0". The unitary area for data recording/reproduction on the optical disk is called a "block". The fixed length data is recorded and reproduced to and from one block. 300,000 blocks are contained in 36,000 tracks on optical disk 12.

The number of sectors of one block is 40 sectors in the inner side of the disk, and is 20 sectors in the outer periphery side. A block header containing a block number, a track number, etc. is recorded at the start position of the block, in a factory. To prevent the block from terminating off the border between sectors, a block gap is used.

Substitution recording region 22 for substitution processing is located in the inner most side on the recording film 16 of optical disk 12, as is shown in FIGS. 3 and 4. Substitution recording region 22 comprises 1,000 tracks, for example, and records the error management information. User recording region 24 is located in the outer side on the recording film. The user recording region is a recording area provided for recording the information.

Substitution recording region 22, as is shown in FIG. 5, includes (main) management information area 26, (sub) management information area 28, and substitution areas 29 for substitution blocks. Main management information area 26 records new error management information (NEMI) and old error management information (OEMI) each of four bytes. Sub management information area 28 records the same information as in the main area 26. Substitution areas 29 contain substitution blocks (substitution areas). Substitution recording area 22 is a special area rejecting the access by the user or the host computer. The substitution blocks are used as substitution areas for the error blocks in the user recording region 24, which is found in the manufacturing stage of optical disks or in the information recording stage.

Control data area 26 (28), as shown in FIG. 6, stores new and old 4-byte error management information (error management information), which is the updated in-record error substitution area information. Thus, the same information are doubly recorded, resulting in improved reliability of the error management information.

Error management information 30 includes initial error substitution area information 32 and in-record error substitution area information 34. Initial error substitution area information 32 is the information to designate the substitution blocks for the inmanufacturing error blocks. After the preheader is read out, if an error block is detected, this substitution block is used as a substitution of the detected error block.

In-record error substitution area information 34 is for designating blocks into which information is properly stored when information is recorded. Specifically, the stored information is reproduced (after read-after-write), and the correct recording is checked depending on whether or not the reproduction is properly performed. If improper, viz., the error block is found, the substitution block is used for the error block. Thus, the information 34 is used for designating the writing of the information, which is found in the recording area to be checked for error occurrence, into another area.

When error management information 30 is recorded into optical disk 12, the latest information, which controls every information from old to new error information, is recorded without fail. Additionally, since the recorded information of the error management information 30 in optical disk 12 has the minimum record unit (4 K bytes), all of the information in error management information 30 can be obtained by merely reading out the minimum record unit. In this respect, the read out speed is improved.

As is shown in FIG. 1, optical head 36 is provided in close proximity to the underside of optical disk 12, for recording and reproducing data on and from the disk. Optical head 36 is mounted on DC linear-motor 38. DC linear-motor 38 consists of movable section 40 and stationary section 42. Optical head 36 is secured on movable section 40. DC linear-motor 38 is connected to linear-motor driver & servo circuit 44, so that movable section 40 is driven when DC linear-motor 38 is driven. When movable section 40 is driven, optical head 36 is moved linearly in the radial directions of optical disk 12, as is shown by arrows a and b. The position of movable section 40, i.e., the position of optical head 36, is detected by position detector 46. The result of detection is supplied to linear-motor driver & servo circuit 44. Position detector 46 is based on a socalled overlap lattice type detection system, and provides two detection signals of different phases (the phase being different depending on the direction of movement) according to the extent of movement of movable section 40, i.e., the extent of movement of optical head 36.

Optical head 36, which is secured to DC linear-motor 38, includes a semiconductor laser, a collimator lens, a beam splitter, an objective lens, a focus drive coil for driving the objective lens toward optical disk 12, a tracking drive coil for driving the objective lens in the radial directions of optical disk 12, a focus detector including a pair of photo-detectors for checking whether a laser beam is focused on optical disk 12, and a tracking detector including a pair of photo-detectors for checking whether a data track of optical disk 12 is being tracked, these components being not shown. Each photo-detector provides a detection signal to a corresponding processing and/or driving circuit to be described later, and each processing and/or driving circuit supplies a predetermined voltage to each drive coil and semiconductor laser.

Controller 48 controls optical disk apparatus 10 according to a control signal supplied from an external apparatus, i.e., the host computer (not shown), via interface 50. Linear-motor driver & servo circuit 44 drives DC linear-motor 38 according to a desired position signal supplied from controller 48 and also the output signal of detector 46.

Motor-drive controller 52 judges the angular velocity of motor 14 according to a velocity clock from motor 14, and controls the velocity to a preset velocity, by means of controller 48. Focus servo circuit 54 controls the focal point of the objective lens in optical head 36 according to the detection signal from the focus detector in optical head 36. Focus pullin circuit 56 permits focus servo circuit 54 to effect accurate focusing at the time of switching from a state in which the lens is out-of-focus, to a state in which the lens is in focus.

Tracking servo circuit 58 moves the objective lens in the radial directions of optical disk 12 according to a detection signal from the tracking detector in optical head 36, such that the laser beam transmitted through the objective lens in optical head 36 is projected onto the center of the track. Track jump pulse generator 60 generates a track-jump pulse according to a control signal from controller 48. When this track-jump pulse is supplied, tracking servo circuit 58 interrupts the servo operation and generates a track-jump drive pulse to move the objective lens such that the laser beam is displaced by one track.

Bit-signal shaper 62 shapes the detection signal from the detector in optical head 36. Digitizer 64 digitizes the shaped signal output of bit-signal shaper 62.

Reference-clock generator 66 generates a reference clock signal. Variable-clock generator 68 generates a clock signal (or reference signal) having a frequency (i.e., a duration) corresponding to clock rate data supplied from controller 48 according to the reference clock signal from reference-clock generator 66. In this case, the frequency of the clock signal generated from variable-clock generator 68 is increased (that is, the duration is reduced) as optical head 36 is moved toward the outer periphery of optical disk 12.

In accordance with a control signal from controller 48, reproduction-sync clock extractor 70 extracts a reproduction-sync clock from data supplied from digitizer 64 whenever the data falls within the frequency range of the clock signal supplied from variable-clock generator 68. Demodulator 72 demodulates data supplied from digitizer 64, using the reproduction-sync clock from reproduction-sync clock extractor 70. Serial/parallel converter 74 effects serial-to-parallel conversion of the reproduced signal output of demodulator 72.

Header discriminator 76 discriminates header data from the reproduced signal output of demodulator 72. Recording/reproduction header register 78 stores header data which is to be accessed, and is supplied from controller 48. Header comparator 80 checks whether or not header data stored in recording/reproduction header register 78 and header data supplied from header discriminator 76 coincide. When the two header data compared coincide, it produces a coincidence signal.

Parallel/serial converter 82 effects parallel/serial conversion of the recording data supplied from recording/reproduction switching circuit 84 to be described later, under the control of the clock signal from variable-clock generator 68. Modulator 86 modulates data supplied from parallel/serial converter 82 under control of the clock signal from variable-clock generator 68. Laser driver 88 drives the semiconductor laser in optical head 36 according to the modulation output of modulator 86, to record data on optical disk 12.

When header comparator 80 provides the coincidence signal, recording/reproduction switching circuit 84 supplies reproduction data, subsequent to header data supplied from serial/parallel converter 74, to recording/reproduction data buffer 90, according to a reproduction control signal supplied from controller 48. Further, when header comparator 80 provides the coincidence signal, circuit 84 supplies recording data supplied from recording/reproduction data buffer 90, to parallel/serial converter 82, according to a recording control signal supplied form controller 48.

Recording/reproduction data buffer 90 stores reproduction data from recording/reproduction switching circuit 84 and also stores recording data from recording/reproduction data-transfer circuit 92, to be described later. Error-correction code addition & error-correction circuit 94 adds error-correction code which is based on the Reed-Solomon method, to recording data stored in recording/reproduction data buffer 90. Error-correction code addition & error correction circuit 94 executes the strict correction in a weak correction power mode, when the read-after-write at the time of recording is performed. At the time of reproduction, it executes the correction in a normal error correction power mode.

Incidentally, the term "weak correction power" means a level of error correction in which the magnitude of error, which is correctable, is smaller than that in the data reproduction. The correction method in error correction code addition & error correction circuit 94, which is based on the cross interleave method, is discussed in Japanese patent application No. 59-15501. A detailed description of the method will be omitted here, and reference is made to the patent application, if necessary.

Recording/reproduction data-transfer circuit 92 transfers reproduction data supplied from recording/reproduction data buffer 90 to the host computer, via interface 50, and also transfers recording data supplied from the host computer, via interface 50, to recording/reproduction data buffer 90.

In ROM 96, which serves as memory circuit, a conversion table as shown in FIG. 8 is stored, in which clock rate data of optical disk 12, the number of sectors in one block at the clock rate, the first block number at the clock rate, and the start sector number in the block are listed for each of the 256 tracks.

When the block number assigned to the position of recording or reproduction, i.e., the access position, is provided from the host computer via interface 50, controller 48 reads out the access position from ROM 96, and causes accessing by DC linear-motor 38 and optical head 36, with the clock signal frequency held constant. The reading (computation) of the clock-rate data and the access position is described in detail in U.S. patent application Ser. No. 704,466, pending, (EPC Patent Application No. 85101982.8) of T. Yoshimaru entitled "Optical Disk Device" filed on Feb. 22, 1985 and assigned to KABUSHIKI KAISHA TOSHIBA; therefore, a detailed description is not given herein.

When optical disk 12 is set in optical disk apparatus 10, viz., it is opened, controller 48 loads into memory buffer 98 the latest error management information as read out of the management information area 26 (28) of optical disk 12. When optical disk 12 is removed from optical disk apparatus 10, viz., it is closed, or when the error management information is updated, controller 48 reads out the error management information from memory buffer 98, and records it as the latest information into the first unrecorded area of management information areas 26 and 28.

Memory buffer 98 has a memory capacity integer times the data minimum recording unit, e.g., 4K bytes of one block. Memory buffer 98, as shown in FIG. 9, stores the initial error substitution area information 100 as error management information and in-record error substitution area information 102.

The operation of optical disk apparatus 10 having the above construction will now be described.

FIG. 10 shows a flowchart for explaining the read out operation of the information processor thus arranged. When optical disk 12 is first set to optical disk apparatus 10, viz., it is opened, controller 48 receives a data record command from the host computer (not shown), via external interface circuit 50 (step S1). Controller 48 supplies a control signal to motor-drive controller 52, to drive motor 14, so as to drive optical disk 12 at a predetermined speed. Controller 48 then reads out, from ROM 96, clock-rate data and the access position, i.e., the track number and first sector number, for the block number corresponding to management information area 26.

Controller 48 supplies the read-out clock-rate data to variable-clock generator 68. Variable-clock generator 68 generates a clock signal at a frequency (i.e., duration) corresponding to clock-rate data supplied from controller 48, using the reference clock signal from reference-clock generator 66, and supplies the generated clock signal to reproduction-sync clock extractor 70, demodulator 72, serial/parallel converter 74, header discriminator 76, parallel/serial converter 82, and modulator 86.

Controller 48 also converts the track number, read out from ROM 96, into a scale value and supplies this value to linear-motor driver & servo circuit 44. Linear-motor driver & servo circuit 44 drives DC linear-motor 38 to drive optical head 36 until there occurs a coincidence of the scale value and the position represented by the output of position detector 46. When the movement of optical head 36 is then stopped, the detection signal from then detector in optical head 36 is shaped in shaper 62 and is the digitized in digitizer 64 to be supplied to reproduction-sync clock extractor 70 and demodulator 72. Reproduction-sync clock extractor 70 extracts a reproduction-sync clock from the supplied data and supplies the extracted clock to demodulator 72.

Demodulator 72 demodulates the read-out data supplied from digitizer 64, using the reproduction-sync clock supplied from reproduction-sync clock extractor 70. The demodulated output is supplied via serial/parallel converter 74 to recording/reproduction switching circuit 84 and is also supplied to header discriminator 76. Header discriminator 76 discriminates only header data from the supplied demodulation output, and supplies the header data to controller 48 and header comparator 80. Controller 48 judges, from the header data, the track in correspondence to optical head 36 and compares this track and the desired track. When it judges that the two compared tracks are spaced apart by several tens of tracks or more, controller 48 causes DC linear-motor 38 to move optical head 36 again. When it judges that the two compared tracks are spaced apart by less than several tens of tracks, controller 48 supplies a control signal to track-jump pulse generator 60, to cause displacement of optical head 36 by a corresponding number of tracks.

When optical disk 12 is brought to the position corresponding to the desired track, header discriminator 76 discriminates only header data and supplies this data to header comparator 80. At this time, header data in the desired block, i.e., the management information area 26, has been preliminarily stored in recording/reproduction header register 78, by controller 48, and the header data in recording/reproduction header register 78 is supplied to header comparator 80. Header comparator 80 compares the two header data and if the two data coincide, it provides the coincidence signal to recording/reproduction switching circuit 84. In response to this coincidence signal, recording/reproduction switching circuit 84 supplies reproduction data, supplied subsequent to the header data, from serial/parallel converter 74 to recording/reproduction data buffer 90.

The reproduction data in recording/reproduction data buffer 90 is supplied to error-correction code-addition & error-correction circuit 94 for error correction before being supplied to controller 48.

Then, 4-K byte error management information 30, supplied from management information areas 26 and 28 on optical disk 12, are successively supplied to controller 48.

Controller 48 reads out the latest error management information 30 from the management information areas 26 and 28 of optical disk 12, and stores the information 30 into memory buffer 98 (step S2). In this case, the latest information 30 read out is the error management information located preceding to the five successive empty areas. The recognition of the information is based on the results of comparison of the latest error management information 30 respectively read out from management information areas 26 and 28, on optical disk 12.

Assume now that when the latest error management information is being stored memory buffer 98 as described above, controller 48 receives a block number to be subjected to data recording or to be accessed, through external interface circuit 50 from the host computer (not shown). Controller 48 checks whether or not the block number is contained in the initial error substitution area information 100 of memory buffer 98, viz., whether or not it is the initial error area (step 3). If it is not the initial error area (step S4), the block number from the host computer is used as the record block (step S5).

If it is the initial error area (step S4), it is used as a block for recording the substitution block read out from initial error substitution area data 100 (step S6) (first substitution processing means).

Controller 48 computes the track, the start sector and clock rate information of a desired block (the block number from the computer on the substitution block), by using the conversion table in ROM 96. The clock rate data is output to variable clock generator 68. In response to this, the generator 68 generates a clock signal of the frequency based on the clock rate data supplied from controller 48, by using the reference clock-rate signal from reference clock generator 66. This clock signal is supplied to reproduction sync clock extractor 70, demodulator 72, serial/parallel converter 74, header discriminator 76, parallel/serial converter 82, and modulator 86. Controller 48, receiving the block number, operates as in the case of accessing the substitution processing area, and directs the light beam from optical head 36 to the track containing the desired block.

At this time, the record data has been stored in reproduction data buffer 90, via external interface circuit 50 and record/reproduction data transfer circuit 92 from the host computer.

The record data of the buffer 90 is supplied to parallel/serial converter 82. The converted record data from the converter 82 is modulated by modulator 86, and supplied to laser driver 88. The driver 88 drives the semiconductor laser placed in optical head 36, to effect data recording.

Subsequently, the record data is checked in the weak correction mode (step S7). In this step, the read-after-write is executed, viz., the recorded block is subjected to the read-out operation. Controller 48 directs the laser beam from optical head 36 to the desired block contained track. A coincident signal from the block header of the desired block is supplied to record/reproduction switching circuit 84, from header comparator 80. At this time, the switching circuit 84 transfers the reproduction data from serial/parallel converter 74 to recording/reproduction data buffer 90. The reproduction data stored in the buffer 90 is subjected to the error correction in the level of the weak correction power, by error correction code addition & error correction circuit 94. When no error is present (step S8), controller 48 completes the record processing.

When an error is present (step S8), controller 48 checks the substitution block to next be used, on the basis of the in-record error substitution area information, and records the recording data into the substitution block, again (step S9). Subsequent to this recording, controller 48 updates the in-record error substitution area information in memory buffer 98 in the substitution block, corresponding to the error block. The information of memory buffer 98 is recorded into the management information areas 26 and 28 of optical disk 12. When an error occurs, controller 48 records again the recording data in another substitution block, and subsequently continues the similar operation (second substitution processing means).

When the error is found a plurality of times during the course of checking recording data, as described above, the information processor can record the error management information, a plurality of times. In checking this record data, when error is found predetermined times, controller 48 sends through external interface 50 to the host computer a status that the subsequent substitution processing is inhibited. Upon receipt of this status, the host computer recognizes this and executes a predetermined processing, for example, the display of that status. Subsequently, optical disk 12 is used only for the reproduction.

The data recording into another block can also be performed in a similar manner. In this case, as the block located is closer to the outer periphery of the optical disk, the data is recorded at a high frequency of the clock signal.

The reproduction operation of optical disk apparatus 10 having the above construction will now be described.

FIG. 11 shows a flowchart for explaining the reproduction operation. When optical disk 12 is first set to optical disk apparatus 10, viz., it is opened, controller 48 receives a data reproduction command from the host computer (not shown), via external interface circuit 50 (step S11. Controller 48 checks whether or not the block number is contained in the initial error substitution area information 100 of memory buffer 98, that is, whether or not it is the initial error substitution area (S12). If not (step S13), the block number from the host computer is decided to be the block to be reproduced (step S14). If the answer is YES (step S13), the substitution block read out from the information 100 is used as the reproduced block (step S15) (third substitution processing means).

As in the case of the recording operation, controller 48 then reads out, from ROM 96, clock-rate data corresponding to the block (the block number from the host computer or the substitution block). Controller 48 supplies the read-out clock-rate data to reproduction sync clock extractor 70, demodulator 72, serial/parallel converter 74, header discriminator 76, parallel/serial converter 82, and demodulator 86. Also it directs the laser beam of optical head 36 to the track containing the desired block.

The coincidence signal from the block header of the desired block is supplied from header comparator 80 to recording/reproduction switching circuit 84. Then, the reproduced data from the converter 82 is supplied to data buffer 90 by switching circuit 84. The reproduced data in the data buffer 90 is subjected to the error correction in the level of the normal error correction power. When no error is found (step S16), controller 48 transfers the reproduced data to the host computer via recording/reproduction data buffer 92 and external interface circuit 50 (step S17). At this point, the reproduction processing ends.

When error is found (step S16), controller 48 reads out the substitution block corresponding to the error block from the in-record error substitution area information 102 of the latest error management information 30 as stored in memory buffer 98. The controller corrects the recorded data of the substitution block in the level of the normal error correction power (step S18). Controller 48 transfers the reproduced data to the host computer through the circuits 92 and 50 (step S17). Then, it completes the reproduction processing (fourth substitution means).

The above processing procedure is correspondingly applied for the reproduction of the data in another block. As the block is positioned closer to the outer peripheral location of the disk, the data reproduction is performed in high frequencies of the clock signal.

In step S18, when the latest management information 30 cannot be read out, the substitution block corresponding to the error block is read out of the in-record error substitution area information 102 of the previous error management information. Therefore, if error occurs in the latest error management information, at least the previously recorded data can be reproduced. Controller 48 sends a status indicative of no further substitution processing, i.e., no further recording to the host computer, via external interface circuit 50. Receiving this status, the host computer recognizes this and executes a predetermined processing, for example, the display of that status. Subsequently, optical disk 12 is used only for the reproduction.

As described above, the optical disk can execute the substitution processing of the error contained area in manufacturing the recording medium or optical disk (12) and in recording the information, for reliability improving purposes. Additionally, the initial error substitution area information and the in-record error substitution area information are both stored into a single memory means. Because of this feature, the processing time in the data recording can be reduced, and the host computer is free from the substitution processing work, and hence the processing work by host computer can be lessened. Additionally, the access operation at the time of opening and closing the optical disk is easy and quickened.

Furthermore, the memory capacity of the memory buffer storing the error management information is 4K bytes, i.e., equal to the minimum record time for the optical disk. This makes the processing work easy. An additional feature is to reproduce the latest error management information. All of the information recorded up to now can be obtained through this reproduction. Therefore, when the optical disk apparatus is driven, it is possible to reduce the time taken for loading the error management information from the optical disk to the memory buffer.

A further feature of the information processor according to this invention is to use the weak correction power (up to one-byte correction can execute) in the record mode. This provides a strict check of data error and improves the reliability of data recording. In the reproduction of data, the normal level of correction power (up to 3-byte correction can execute) is used for error check. For only the block from which data cannot be reproduced, the reproduction of the substitution processed data is executed. Accordingly, no substitution processing is applied to the block which is decided to contain error by the check with the weak correction power, and is substitution processed, but whose data error is correctable by the correction power in the normal level in the reproduction mode. In other words, normally, the data is recorded in the continuously arrayed blocks, and only the data to be recorded in the error block is recorded in the area 29 for substitution block. Therefore, in the data reproduction, the access to the continuous blocks rather than to the substitution blocks takes less time. This implies that, to access the data of the type which is decided to contain the error by the check with the weak correction power, but is correctable by the normal level of correction power, it is undesirable to use the slow substitution block access. The feature as mentioned above reduces the number of accesses required for the substitution processing. This brings about the improvements of access speed, and the efficient processing, while keeping a satisfactory reliability.

In the data recording and reproducing modes, the substitution processing is applied for the area, referring to the initial substitution area information stored in the memory buffer. Only when the error area is found through the check of read-after-write at the time of data recording and reproduction, the error contained area is subjected to the substitution processing by using the in-record error substitution area information portion. Therefore, the substitution processing procedure for the initial error is distinguished from that for the in-record error, so that the states of error, such as natures and features of errors, are distinctly recognized. The result is that the substitution processing can be effectively performed.

The in-record error substitution area information in the memory buffer is updated for each substitution processing at the time of data processing. Every time the optical disk is closed, the error management information made up of the initial error substitution area information and the in-record error substitution area information, both being stored in the memory buffer, is recorded into the management information area within the substitution processing area in the optical disk. In this case, the initial error substitution area information and the in-record error substitution area information are stored together, and therefore, any special processing is required for each of these information in recording the information into the optical disk. The error management information is under control of the optical disk apparatus, there is no danger that the host computer erroneously destroys the error management information. This indicates the improvement of the reliability of error management information. Furthermore, the entire error management can be conducted by the optical disk apparatus side only. When considering the recording format in the optical disk, the information recording medium has a compatibility with other information recording media. Additionally, the substitution area information as the management information for the initial error and the in-record error is treated as one unit. This feature improves the speed of the internal processing of the apparatus.

In the above-mentioned embodiment, the substitution processing is applied for the error area. Alternatively, the command from the host computer may be used to select the execution or non-execution of the substitution processing. In this case, the processor is compatible with the prior apparatus.

As described above, the substitution blocks for the error blocks in the user recording region are recorded into a region different from the user recording region. Therefore, the user recording region an be used without any reduction of the actual recording capacity. Since the management information area and the substitution blocks are at fixed locations on the optical disk, the optical disk has a compatibility with other disks.

The optical disk as the information recording medium may be replaced by any other equivalent medium, such as floppy disk and laser disks, if necessary.

What is claimed is:

1. An information recording disk medium for recording information comprising:
    a recording region for recording information; and
    a substitution area wound substantially 360° in a circumferential direction of said information recording disk medium, when information is recorded into said recording region, if an error area unable to correctly record information is found in said recording region, said substitution area being used for recording the information to be recorded in said error area, in place of said error area.

2. The information recording disk medium according to claim 1, further comprising a management information area for storing management information, said management information including initial error substitution area information indicating a substitution area for recording the information in place of an initial error area, and in-record error substitution area information indicating a substitution area used for recording information in place of an error area found in recording information into said recording region.

3. The information recording disk medium according to claim 2, wherein said management information area includes two management information areas, each management information area recording the same error management information.

4. A system for recording information onto a disk medium, comprising:
    an information recording disk medium including a recording area for recording information, and a substitution area, wound substantially 360° in a circumferential direction of said information recording disk medium, for recording information; and
    a disk apparatus, said disk apparatus including:
    buffer memory means for temporarily storing information to be recorded onto said information recording disk medium,
    means for recording the information temporarily stored in said buffer memory means in the recording area of said information recording disk medium,
    first means for reading information out of the recording area after the information temporarily stored in said buffer memory means is completely recorded in the recording area by said recording means,
    first means for checking whether information is correctly recorded in the recording area by comparing the information read by said reading means with the information temporarily stored in said buffer memory means, and
    first re-recording means for re-recording the information temporarily stored in said buffer memory means in one portion of said substitution area if said first checking means determines that the information is not correctly recorded in the recording area.

5. The system according to claim 4, wherein said disk apparatus further comprises:
    second means for reading information out of the substitution area after the information temporarily stored in said buffer memory means is completely re-recorded in the substitution area by said re-recording means;
    second means for checking whether information is correctly recorded in the substitution area by comparing the information read by said second reading means with the information temporarily stored in said buffer memory means; and
    second means for re-recording the information temporarily stored in said buffer memory means in another portion of the substitution area of said information recording disk medium if said second checking means determines that the information is not correctly recorded in the substitution area.

6. The system according to claim 4, wherein said disk apparatus further comprises:
    means for storing management information, said management information including address data representing that portion of the recording area which said first checking means determines to be a defective portion inappropriate for correct recording of information, and address data representing that portion of the substitution area wherein the information which should have been recorded in the defective portion of the recording area is recorded; and
    means for recording the management information stored in said management information storing means at a predetermined location of said information recording disk medium.

7. The system according to claim 6, wherein said disk apparatus further includes:
    means for reading the management information out of the predetermined location of said disk medium;
    means for storing the management information read by said management information reading means in said management information storing means; and
    means for updating the management information stored in said management information storing means each time said first checking means determines that information is not correctly recorded, the management information being updated such that the updated management information includes address data representing a portion of the substitution area which prevents correct recording of information.

8. The system according to claim 7, wherein said disk apparatus further comprises:
    second reading means, supplied with data representing that portion of the recording area from which information is to be read out, for reading the information out of that portion of the recording area;
means for performing error detection and correction with respect to the information read out by said second reading means; and
third reading means for reading information from that portion of the substitution area which corresponds to the recording area portion represented by the management information stored in said management information storing means, said third reading means reading the information if a correction error occurs in the error correction performed by said error correction means.

9. A system for recording information onto a disk medium, comprising:
a disk medium including:
a recording area for recording information,
a substitution area wound substantially 360° in a circumferential direction of said disk medium, for recording information, and
a management area for recording error-management information, the error-management information having data representing an originally-defective portion which is produced in the recording area during manufacture of said disk medium and which is prohibited form being accessed, and data representing that portion of the substitution area which is used for recording information instead of the originally-defective portion; and
a disk apparatus including:
means for reading the error-management information out of the management area when said disk medium is loaded in said disk apparatus,
means for storing the error-management information read out by said reading means,
means for determining whether a portion of the recording area to which information is to be recorded includes the originally-defective portion, by using the error-management information stored in said storing means, and
means for recording the information in a portion of the substitution area represented by the error-management information stored in said storing means if said determining means determines that said portion of the recording area includes the originally-defective portion.

10. The system according to claim 9, wherein said disk apparatus further comprises:
second determining means, supplied with data representing a portion of the recording area from which information is to be read out, for determining whether said portion of the recording area includes the originally-defective portion by using the error-management information stored in said storing means; and
means for reading information from the portion of the substitution area which is represented by the error-management information stored in said storing means if said second determining means determines that said portion of the recording area includes the originally-defective portion.

* * * * *